United States Patent
Zhang

(10) Patent No.: US 10,575,326 B2
(45) Date of Patent: Feb. 25, 2020

(54) DATA TRANSMISSION METHOD AND DEVICE

(71) Applicant: Huawei Technologies Co., Ltd., Shenzhen (CN)

(72) Inventor: Jinfang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 15/582,061

(22) Filed: Apr. 28, 2017

(65) Prior Publication Data

US 2017/0238338 A1 Aug. 17, 2017

Related U.S. Application Data

(63) Continuation of application No. PCT/CN2014/090108, filed on Oct. 31, 2014.

(51) Int. Cl.
*H04W 72/14* (2009.01)
*H04W 72/12* (2009.01)
(Continued)

(52) U.S. Cl.
CPC ....... *H04W 72/14* (2013.01); *H04W 72/1284* (2013.01); *H04W 84/042* (2013.01); *H04W 88/16* (2013.01)

(58) Field of Classification Search
CPC ............. H04W 72/14; H04W 72/1284; H04W 72/1289; H04W 84/042; H04W 88/16
See application file for complete search history.

(56) References Cited

U.S. PATENT DOCUMENTS

2002/0064167 A1 5/2002 Khan et al.
2012/0099548 A1* 4/2012 Yan ........................ H04W 28/18
370/329
(Continued)

FOREIGN PATENT DOCUMENTS

CN 101170743 A 4/2008
CN 101472300 A 7/2009
(Continued)

OTHER PUBLICATIONS

Brueck et al., "Centralized Scheduling for Joint Transmission Coordinated Multi-Point in LTE-Advanced," IEEE 2010 International ITG Workshop on Smart Antennas (WSA 2010), pp. 177-184, The Institute of Electrical and Electronics Engineers, New York, New York (2010).

(Continued)

*Primary Examiner* — Walli Z Butt
(74) *Attorney, Agent, or Firm* — Leydig, Voit & Mayer, Ltd.

(57) ABSTRACT

A data transmission method and device, related to the communications field, are disclosed, so as to resolve a prior-art problem that a data decoding error occurs on user equipment because data packets sent by different coordinated network devices to the same user equipment on a same time-frequency resource are different resulting from a data packet loss. A specific solution is: receiving a scheduling grant message (201), where the scheduling grant message includes an identifier of a data packet and time-frequency resource information; and when it is determined, according to the identifier of the data packet, that the data packet is stored in a buffer, sending, according to the time-frequency resource information, the data packet to user equipment on a time-frequency resource indicated by the time-frequency (Continued)

resource information (203); or if the data packet is not stored in a buffer, skipping sending the data packet (204).

10 Claims, 5 Drawing Sheets

(51) Int. Cl.
*H04W 84/04* (2009.01)
*H04W 88/16* (2009.01)

(56) References Cited

U.S. PATENT DOCUMENTS

| | | | |
|---|---|---|---|
| 2013/0170461 A1* | 7/2013 | Ren | H04L 1/1893 |
| | | | 370/329 |
| 2014/0341177 A1* | 11/2014 | Mukherjee | H04L 5/0007 |
| | | | 370/330 |
| 2015/0009931 A1* | 1/2015 | Yamazaki | H04B 7/024 |
| | | | 370/329 |

FOREIGN PATENT DOCUMENTS

| | | |
|---|---|---|
| CN | 102395163 A | 3/2012 |
| CN | 102656938 A | 9/2012 |
| EP | 2389026 A1 | 11/2011 |
| EP | 2613468 A1 | 7/2013 |
| WO | WO 2010112086 A1 | 10/2010 |
| WO | 2011020062 A2 | 2/2011 |
| WO | 2013122164 A1 | 8/2013 |

OTHER PUBLICATIONS

CN/102656938A, Office Action, dated Apr. 30, 2019.

* cited by examiner

DATA TRANSMISSION METHOD AND DEVICE

CROSS-REFERENCE TO RELATED APPLICATIONS

This application is a continuation of International Application No. PCT/CN2014/090108, filed on Oct. 31, 2014, the disclosure of which is hereby incorporated by reference in its entirety.

TECHNICAL FIELD

The present invention relates to the communications field, and in particular, to a data transmission method and device.

BACKGROUND

A multipoint joint transmission technology is an important data transmission technology in LTE-A (Long Term Evolution Advanced, Long Term Evolution Advanced) and a future 5G network. The multipoint joint transmission technology means that multiple coordinated network devices that are geographically separate jointly transmit same data or jointly receive same data. In LTE-A, a typical multipoint joint transmission technology is a COMP (Coordinated MultiPoint transmission and reception, coordinated multipoint transmission/reception) technology. The COMP technology may be divided into an uplink COMP technology and a downlink COMP technology.

The downlink COMP, which is a downlink data packet processing mode, means that multiple coordinated network devices simultaneously transmit same data to user equipment. Specifically, a gateway or a main network device transmits a same data packet to the multiple coordinated network devices, and the coordinated network devices transmit the data packet to the user equipment. The coordinated network devices transmit the same data packet to the user equipment on a same time-frequency resource, and the user equipment combines same information transmitted by the coordinated network devices through different channels to obtain a diversity gain. Alternatively, after performing joint precoding, all of the coordinated network devices transmit the same data packet to the user equipment on a same time-frequency resource. The coordinated network devices effectively overcome interference between multiple users by using a precoding matrix, so as to improve data quality.

However, in a process in which the gateway or the main network device transmits the data packet to each coordinated network device, a data packet loss may be caused resulting from a cause such as network congestion or a transmission error. Therefore, the data packets sent by the coordinated network devices to the user equipment on the same time-frequency resource may be different, causing a data decoding error on the user equipment. For example, in a process in which two coordinated network devices obtain two data packets transmitted by the gateway or the main network device, resulting from a data packet loss, a first coordinated network device receives only a data packet 2, and a second coordinated network device receives a data packet 1 and the data packet 2. The first coordinated network device sends the data packet 2 to the user equipment, but the second coordinated network device sends the data packet 1 to the user equipment on a same time-frequency resource. Different coordinated network devices send different data packets to same user equipment on a same time-frequency resource, causing a data decoding error on the user equipment.

SUMMARY

Embodiments of the present invention provide a data transmission method and device, so as to resolve a prior-art problem that a data decoding error occurs on user equipment because data packets sent by different coordinated network devices to the same user equipment on a same time-frequency resource are different resulting from a data packet loss.

To achieve the foregoing objective, the following technical solutions are used in the embodiments of the present invention:

According to a first aspect, an embodiment of the present invention provides a network device, applied to a multipoint joint transmission technology and including:

a receiving unit, configured to receive a scheduling grant message, where the scheduling grant message includes an identifier of a data packet and time-frequency resource information, the identifier of the data packet is used to mark the data packet, and the time-frequency resource information is used to indicate a time domain resource and a frequency domain resource that are occupied for transmitting the data packet; and a sending unit, configured to determine, according to the identifier of the data packet, whether the data packet is stored in a buffer, where the sending unit is further configured to: when the data packet is stored in the buffer, send, according to the time-frequency resource information, the data packet to user equipment on the time-frequency resource indicated by the time-frequency resource information.

With reference to the first aspect, in a first possible implementation manner, the sending unit is further configured to send a scheduling request message to a scheduling device, so that the scheduling device generates the scheduling grant message according to the scheduling request message, where the scheduling request message includes the identifier of the data packet.

With reference to the first possible implementation manner of the first aspect, in a second possible implementation manner, the scheduling request message further includes an identifier of the user equipment and an identifier of a data stream, where the identifier of the data stream is used to mark the data stream, and the data packet belongs to the data stream.

With reference to the first aspect, in a third possible implementation manner, the scheduling grant message further includes an identifier of the user equipment, an identifier of a data stream, and modulation and coding information, where the identifier of the data stream is used to mark the data stream, the data packet belongs to the data stream, and the modulation and coding information is used to indicate a modulation and coding scheme of the data packet;

the network device further includes a modulation and coding unit, configured to: when the data packet is stored in the buffer, perform modulation and coding on the data packet according to the modulation and coding information; and the sending unit is further configured to send the data packet and the modulation and coding information to the user equipment on the time-frequency resource indicated by the time-frequency resource information, so that after receiving the data packet, the user equipment decodes the data packet according to the modulation and decoding information.

With reference to the first aspect to the third possible implementation manner of the first aspect, in a fourth possible implementation manner, the receiving unit is further configured to receive the data packet sent by a gateway, where the data packet includes the identifier of the data packet.

According to a second aspect, an embodiment of the present invention provides a scheduling device, applied to a multipoint joint transmission technology and including:

a receiving unit, configured to receive a scheduling request message, where the scheduling request message includes an identifier of a data packet, the identifier of the data packet is used to mark the data packet, and the data packet is a data packet that user equipment needs to receive;

a scheduling unit, configured to allocate, according to the scheduling request message, time-frequency resources to at least two network devices for sending the data packet and generate time-frequency resource information, where the time-frequency resource information is used to indicate a time domain resource and a frequency domain resource that are occupied for sending the data packet by the at least two network devices; and a sending unit, configured to send the scheduling grant message to the at least two network devices, where the scheduling grant message includes the identifier of the data packet and the time-frequency resource information.

With reference to the second aspect, in a first possible implementation manner, the scheduling request message further includes an identifier of the user equipment and an identifier of a data stream, where the identifier of the data stream is used to mark the data stream, and the data packet belongs to the data stream;

the scheduling unit is further configured to determine a modulation and coding scheme of the data packet and generate modulation and coding information, where the modulation and coding information is used to indicate the modulation and coding scheme of the data packet; and the scheduling grant message further includes the identifier of the user equipment, the identifier of the data stream, and the modulation and coding information.

According to a third aspect, an embodiment of the present invention provides a network device, including a processor, a bus, a memory, a transmitter, and a receiver, where the processor, the memory, the transmitter, and the receiver are connected to each other by using the bus;

the receiver is configured to receive a scheduling grant message, where the scheduling grant message includes an identifier of a data packet and time-frequency resource information, the identifier of the data packet is used to mark the data packet, and the time-frequency resource information is used to indicate a time domain resource and a frequency domain resource that are occupied for transmitting the data packet;

the processor is configured to determine, according to the identifier of the data packet, whether the data packet is stored in the memory; and the transmitter is further configured to: when the data packet is stored in the buffer, send, according to the time-frequency resource information, the data packet to user equipment on the time-frequency resource indicated by the time-frequency resource information.

With reference to the third aspect, in a first possible implementation manner, the transmitter is further configured to send a scheduling request message to a scheduling device, so that the scheduling device generates the scheduling grant message according to the scheduling request message, where the scheduling request message includes the identifier of the data packet.

With reference to the first possible implementation manner of the third aspect, in a second possible implementation manner, the scheduling request message further includes an identifier of the user equipment and an identifier of a data stream, where the identifier of the data stream is used to mark the data stream, and the data packet belongs to the data stream.

With reference to the third aspect, in a third possible implementation manner, the scheduling grant message further includes an identifier of the user equipment, an identifier of a data stream, and modulation and coding information, where the identifier of the data stream is used to mark the data stream, the data packet belongs to the data stream, and the modulation and coding information is used to indicate a modulation and coding scheme of the data packet;

the processor is further configured to: when the data packet is stored in the buffer, perform modulation and coding on the data packet according to the modulation and coding information; and the transmitter is further configured to send the data packet and the modulation and coding information to the user equipment on the time-frequency resource indicated by the time-frequency resource information, so that after receiving the data packet, the user equipment decodes the data packet according to the modulation and decoding information.

With reference to the third aspect to the third implementation manner of the third aspect, in a fourth possible implementation manner, the receiver is further configured to receive the data packet sent by a gateway, where the data packet includes the identifier of the data packet.

According to a fourth aspect, an embodiment of the present invention provides a scheduling device, including a processor, a bus, a memory, a transmitter, and a receiver, where the processor, the memory, the transmitter, and the receiver are connected to each other by using the bus;

the receiver is configured to receive a scheduling request message, where the scheduling request message includes an identifier of a data packet, the identifier of the data packet is used to mark the data packet, and the data packet is a data packet that user equipment needs to receive;

the processor is configured to allocate, according to the scheduling request message, time-frequency resources to the at least two network devices for sending the data packet and generate time-frequency resource information, where the time-frequency resource information is used to indicate a time domain resource and a frequency domain resource that are occupied for sending the data packet by the at least two network devices; and the transmitter is configured to send the scheduling grant message to the at least two network devices, where the scheduling grant message includes the identifier of the data packet and the time-frequency resource information.

With reference to the fourth aspect, in a first possible implementation manner, the scheduling request message further includes an identifier of the user equipment and an identifier of a data stream, where the identifier of the data stream is used to mark the data stream, and the data packet belongs to the data stream;

the processor is further configured to determine a modulation and coding scheme of the data packet and generate modulation and coding information, where the modulation and coding information is used to indicate the modulation and coding scheme of the data packet; and the scheduling grant message further includes the identifier of the user equipment, the identifier of the data stream, and the modulation and coding information.

According to a fifth aspect, an embodiment of the present invention provides a data transmission method, applied to a network device in multipoint joint transmission and including:

receiving a scheduling grant message, where the scheduling grant message includes an identifier of a data packet and time-frequency resource information, the identifier of the data packet is used to mark the data packet, and the time-frequency resource information is used to indicate a time domain resource and a frequency domain resource that are occupied for transmitting the data packet;

determining, according to the identifier of the data packet, whether the data packet is stored in a buffer; and sending, according to the time-frequency resource information, the data packet to user equipment on the time-frequency resource indicated by the time-frequency resource information, if the data packet is stored in the buffer.

With reference to the fifth aspect, in a first possible implementation manner, before the receiving a scheduling grant message, the method further includes:

sending a scheduling request message to a scheduling device, so that the scheduling device generates the scheduling grant message according to the scheduling request message, where the scheduling request message includes the identifier of the data packet.

With reference to the first possible implementation manner of the fifth aspect, in a second possible implementation manner, the scheduling request message further includes an identifier of the user equipment and an identifier of a data stream, where the identifier of the data stream is used to mark the data stream, and the data packet belongs to the data stream.

With reference to the fifth aspect, in a third possible implementation manner, the scheduling grant message further includes an identifier of the user equipment, an identifier of a data stream, and modulation and coding information, where the identifier of the data stream is used to mark the data stream, the data packet belongs to the data stream, and the modulation and coding information is used to indicate a modulation and coding scheme of the data packet; and the sending, according to the time-frequency resource information, the data packet to user equipment on the time-frequency resource indicated by the time-frequency resource information, if the data packet is stored in the buffer includes:

if the data packet is stored in the buffer, performing modulation and coding on the data packet according to the modulation and coding information, and sending the data packet and the modulation and coding information to the user equipment on the time-frequency resource indicated by the time-frequency resource information, so that after receiving the data packet, the user equipment decodes the data packet according to the modulation and decoding information.

With reference to the fifth aspect to the third possible implementation manner of the fifth aspect, in a fourth possible implementation manner, before the receiving a scheduling grant message, the method further includes:

receiving the data packet sent by a gateway, where the data packet includes the identifier of the data packet.

According to a sixth aspect, an embodiment of the present invention provides a data transmission method, applied to a scheduling device in multipoint joint transmission and including:

receiving a scheduling request message, where the scheduling request message includes an identifier of a data packet, and the identifier of the data packet is used to mark the data packet;

allocating, according to the scheduling request message, time-frequency resources to at least two network devices for sending the data packet, and generating time-frequency resource information, where the time-frequency resource information is used to indicate a time domain resource and a frequency domain resource that are occupied for sending the data packet by the at least two network devices; and sending the scheduling grant message to the at least two network devices, where the scheduling grant message includes the identifier of the data packet and the time-frequency resource information.

With reference to the sixth aspect, in a first possible implementation manner, the scheduling request message further includes an identifier of user equipment and an identifier of a data stream, where the identifier of the data stream is used to mark the data stream, and the data packet belongs to the data stream; and the method further includes:

determining a modulation and coding scheme of the data packet and generating modulation and coding information, where the modulation and coding information is used to indicate the modulation and coding scheme of the data packet; and the scheduling grant message further includes the identifier of the user equipment, the identifier of the data stream, and the modulation and coding information.

According to the data transmission method and device provided by the embodiments of the present invention, a received scheduling grant message includes an identifier of a data packet. It is determined, according to the identifier of the data packet, whether the data packet is stored in a buffer. If the data packet is not stored in a buffer, it indicates that the data packet may be lost in a process in which a gateway 101 or a main network device transmits the data packet to each coordinated network device. In this case, the coordinated network device does not send the data packet. This can resolve a problem that a data decoding error occurs on user equipment because data packets sent by the coordinated network devices on a same time-frequency resource are different.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
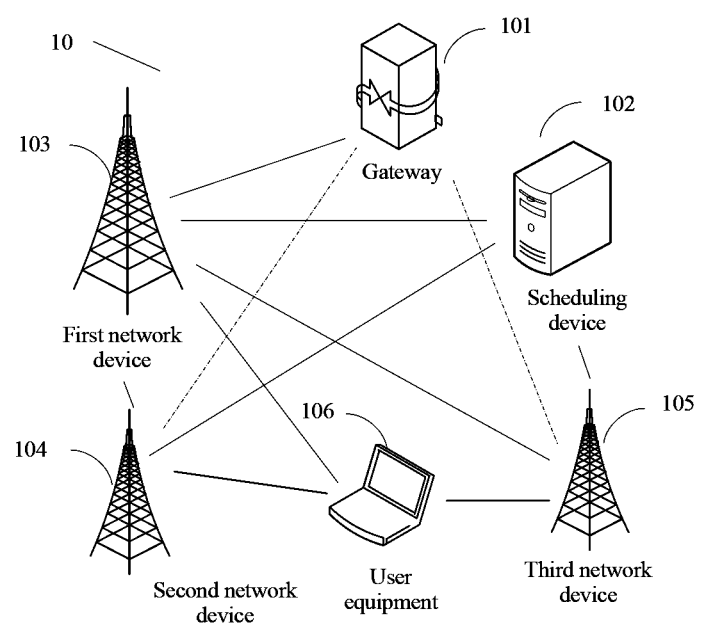
FIG. 1 is a schematic structural diagram of a network system according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

An embodiment of the present invention provides a network system 10. A structure of the network system 10 may be shown in FIG. 1, including a gateway 101, a scheduling device 102, a first network device 103, a second network device 104, a third network device 105, and user equipment 106. The first network device 103, the second network device 104, and the third network device 105 are network devices for multipoint joint transmission. The first network device 103 is a main network device, and the second network device 104 and the third network device 105 are coordinated network devices. Preferably, in an application scenario, the gateway sends a data packet to each network device; or the gateway sends a data packet to the main network device, and the main network device sends the data packet to each coordinated network device. Then, the network devices coordinate with each other to send same data packets to the user equipment 106. The scheduling device 102 is configured to allocate time-frequency resources to the main network device and each coordinated network device, and perform managing and scheduling for the network devices. The first network device 103, the second network device 104, and the third network device 105 may be base stations, and the user equipment 106 may be an electronic device such as a computer or a mobile phone. In this embodiment, a computer is used as an example, and this does not indicate that this embodiment is limited thereto. For example, an architecture of the network system 10 may be a Hetnet access network architecture, or may be a C-RAN network architecture. The present invention sets no specific limit thereto.

Figure 2:
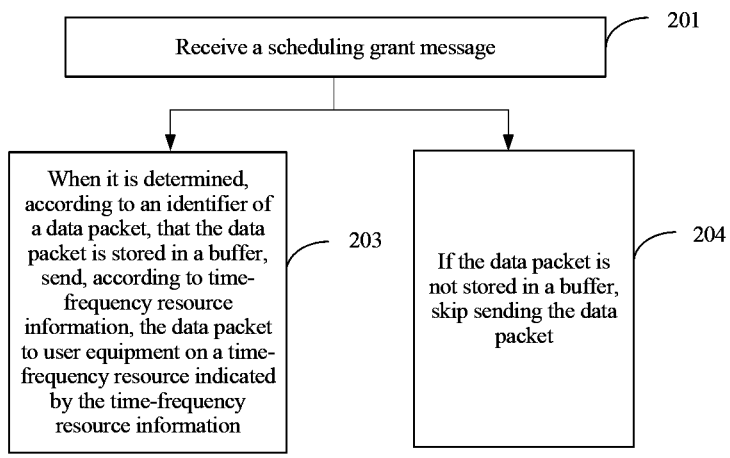
FIG. 2 is a schematic flowchart of a data transmission method according to an embodiment of the present invention.

An embodiment of the present invention provides a data transmission method applied to a network device, optionally, applied to the network device in the network system shown in FIG. 1. The network device may be the first network device 103, the second network device 104, or the third network device 105 in the network system shown in FIG. 1. Referring to FIG. 2, the data transmission method provided by this embodiment of the present invention includes the following steps.

201. Receive a scheduling grant message.

Specifically, the scheduling grant message includes an identifier of a data packet and time-frequency resource information, the identifier of the data packet is used to mark the data packet, and the time-frequency resource information is used to indicate a time domain resource and a frequency domain resource that are occupied for transmitting the data packet.

Preferably, in the COMP technology, the network device receives the scheduling grant message. For the network system shown in FIG. 1, that is, the first network device 103, the second network device 104, and the third network device 105 receive the scheduling grant message sent by the scheduling device 102.

The time-frequency resource information is used to indicate a time and a frequency that each network device transmits the data packet to user equipment. That is, the data packet is transmitted during which time segment and on which frequency.

Optionally, the scheduling grant message further includes an identifier of the user equipment, an identifier of a data stream, and modulation and coding information. The identifier of the user equipment is used to mark the user equipment, the identifier of the data stream is used to mark the data stream, the data packet belongs to the data stream, and the modulation and coding information is used to perform modulation and coding on the data packet.

202. When it is determined, according to an identifier of a data packet, that the data packet is stored in a buffer, send, according to time-frequency resource information, the data packet to user equipment on a time-frequency resource indicated by the time-frequency resource information.

If the data packet is stored in the buffer, modulation and coding may be performed on the data packet according to the modulation and coding information. Then, the data packet and the modulation and coding information are sent to the user equipment on the time-frequency resource indicated by the time-frequency resource information, so that after receiving the data packet, the user equipment decodes the data packet according to the modulation and decoding information.

After step 202, the method further includes:

203. If the data packet is not stored in a buffer, skip sending the data packet.

If the data packet is not stored in the buffer, it indicates that the data packet may be lost in a process in which a coordinated network device receives the data packet. In this case, the data packet is not to be sent.

Optionally, if no data packet loss occurs on the coordinated network device, in this case, the multiple data packets may be multiplexed together to form a transport block to be transmitted to the user equipment. Because the multiple data packets are multiplexed together to form a transport block for transmission, when a data packet on the coordinated network device is lost, another data packet is not to be sent. That is, the coordinated network device does not perform sending this time.

According to the data transmission method provided by this embodiment of the present invention, a received scheduling grant message includes an identifier of a data packet. It is determined, according to the identifier of the data packet, whether the data packet is stored in a buffer. If the data packet is not stored in a buffer, it indicates that the data packet may be lost in a process in which a gateway 101 or a main network device transmits the data packet to each coordinated network device. In this case, the coordinated network device does not send the data packet. This can resolve a problem that a data decoding error occurs on user equipment because data packets sent by the coordinated network devices on a same time-frequency resource are different.

Figure 3:
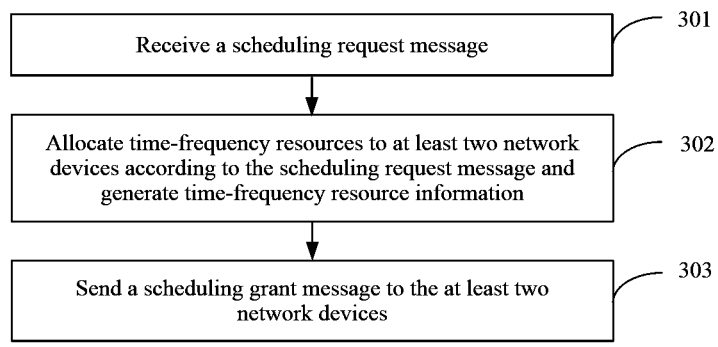
FIG. 3 is a schematic flowchart of a data transmission method according to another embodiment of the present invention.

With reference to the foregoing embodiment corresponding to FIG. 2, another embodiment of the present invention provides a data transmission method applied to a scheduling device 102, preferably, applied to the scheduling device 102 in the network system shown in FIG. 1. Referring to FIG. 3, the data transmission method includes the following steps.

301. Receive a scheduling request message.

The scheduling request message includes an identifier a data packet. The identifier of the data packet is used to mark the data packet.

Optionally, it may be that a first network device 103 sends the scheduling request message to the scheduling device 102, or a second network device 104 or a third network device 105 sends the scheduling request message to the scheduling device 102, so that after receiving the scheduling request message, the scheduling device 102 generates a scheduling grant message according to the scheduling request message.

The scheduling request message further includes an identifier of user equipment and an identifier of a data stream. The identifier of the data stream is used to mark the data stream, and the data packet belongs to the data stream.

Optionally, the scheduling request message may further include a data amount of the data packet. The data amount of the data packet is used to indicate a capacity of the data packet. If a capacity of a data packet exceeds a maximum value of a capacity of a transport block, or a capacity of multiple multiplexed data packets exceeds a maximum value of a capacity of a transport block, the data packet may be transmitted by blocks.

302. Allocate time-frequency resources to at least two network devices according to the scheduling request message and generate time-frequency resource information.

The time-frequency resource information is used to indicate a time domain resource and a frequency domain resource that are occupied for sending the data packet by the at least two network devices. That is, the data packet is transmitted during which time segment and on which frequency.

303. Send a scheduling grant message to the at least two network devices.

The scheduling grant message includes the identifier of the data packet and the time-frequency resource information. Optionally, the scheduling grant message may further include the identifier of the user equipment, the identifier of the data stream, and modulation and coding information.

In this embodiment, the scheduling device 102 may send the scheduling grant message to the first network device 103, the second network device 104, and the third network device 105.

According to the data transmission method provided by this embodiment of the present invention, a received scheduling grant message includes an identifier of a data packet. The scheduling grant message is sent to each network device. In this way, the network device can determine, according to the identifier of the data packet, whether the data packet is stored in a buffer. If the data packet is not stored in a buffer, it indicates that the data packet may be lost in a process in which a gateway 101 or a main network device transmits the data packet to each coordinated network device. In this case, the coordinated network device does not send the data packet. This can resolve a problem that a data decoding error occurs on user equipment because data packets sent by the coordinated network devices on a same time-frequency resource are different.

Figure 4:
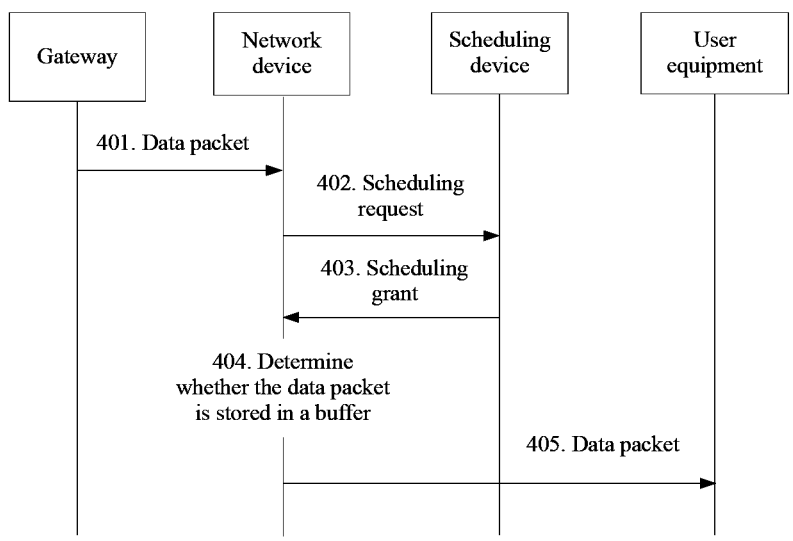
FIG. 4 is a schematic flowchart of a data transmission method according to still another embodiment of the present invention.

Based on the embodiments corresponding to FIG. 2 and FIG. 3, still another embodiment of the present invention provides a data transmission method, preferably, applied to the network system shown in FIG. 1. Referring to FIG. 4, the data transmission method includes the following steps.

401. A main network device and each coordinated network device receive a data packet sent by a gateway 101.

The data packet includes an identifier of the data packet. Optionally, that the gateway 101 sends the data packet to the main network device and each coordinated network device may include two cases. Case 1: The gateway 101 may add the identifier of the data packet to the data packet, and directly send the data packet to the main network device and each coordinated network device. In this case, the main network device is a network device that initiates a scheduling request. Case 2: The gateway 101 may first send the data packet to the main network device; after adding the identifier of the data packet to the data packet, the main network device forwards the data packet with the identifier to each coordinated network device, that is, a second network device 104 and a third network device 105.

Case 1: The gateway 101 directly sends the data packet to the main network device and each coordinated network device. Optionally, the gateway 101 may send the data packet to the main network device and each coordinated network device through different channels. For example, if the gateway 101 sends the data packet through a GTP (GPRS Tunnelling Protocol, GPRS tunneling protocol) channel, the data packet may be identified according to a sequence number in a GTP header. As shown in Table 1, a GTP data packet may include: a message type, a message length, a tunnel endpoint identifier, a sequence number, a network protocol data unit ID, a next extension header type, and a GTP payload. The message type is used to indicate a type of a message, the message length is used to indicate a length of the message, the tunnel endpoint identifier is used to indicate a tunnel endpoint identifier in a peer GTP protocol entity, and the sequence number is used to indicate a sequence number when the message is being transmitted. If the gateway 101 uses an IP (Internet Protocol, Internet Protocol) packet to send the data packet, the data packet may be identified according to an identifier of a data packet and a fragment offset that are in an IP header. As shown in Table 2, the IP data packet may include: a header length, a service type, a total length, the identifier of the data packet, a fragment identifier, the fragment offset, a header checksum, a source address, a destination address, and an IP payload.

TABLE 1

| Version | Protocol type | Spare bit | Extension header flag | Sequence number flag | N-PDU number flag |
|---|---|---|---|---|---|
| Message type | | | | | |
| Length (1$^{st}$ Octet) | | | | | |
| Length (2$^{nd}$ Octet) | | | | | |
| Tunnel endpoint identifier TEID (1$^{st}$ Octet) | | | | | |
| Tunnel endpoint identifier TEID (1$^{st}$ Octet) | | | | | |
| Tunnel endpoint identifier TEID (1$^{st}$ Octet) | | | | | |
| Tunnel endpoint identifier TEID (1$^{st}$ Octet) | | | | | |

TABLE 1-continued

| Version | Protocol type | Spare bit | Extension header flag | Sequence number flag | N-PDU number flag |
|---|---|---|---|---|---|
| Sequence number (1st Octet) | | | | | |
| Sequence number (2nd Octet) | | | | | |
| Network protocol data unit number | | | | | |
| Next extension header type | | | | | |
| GTP payload | | | | | |

TABLE 2

| Version | Header length | Type of service | | Total length |
|---|---|---|---|---|
| Identifier of data packet | | | Fragment flag | Fragment offset |
| Time to live | | Protocol | | Header checksum |
| Source address | | | | |
| Destination address | | | | |
| IP payload | | | | |

Case 2: The gateway 101 may first send the data packet to the main network device. The data packet may be first buffered in the main network device. The data packet is forwarded to each coordinated network device by using the main network device. An LTE network is used as an example for description. The data packet may be identified according to a layer of the data packet in a protocol stack when the main network device forwards the data packet. For example, if the data packet is buffered in a PDCP (Packet Data Convergence Protocol, Packet Data Convergence Protocol) layer, the data packet may be identified according to a sequence number of the PDCP layer. If the data packet is buffered in an RLC (Radio Link Control, Radio Link Control) layer and the RLC layer uses an acknowledged or unacknowledged mode, the data packet may be identified according to a sequence number of the RLC layer. If the RLC layer uses a transparent mode, a new sequence number is added to the RLC layer, to identify the data packet.

402. The network device sends a scheduling request message.

Specifically, the scheduling request message includes the identifier of the data packet. Optionally, the scheduling request message further includes an identifier of user equipment and an identifier of a data stream. The identifier of the data stream is used to mark the data stream, and the data packet belongs to the data stream.

Optionally, the scheduling request message may further include a data amount of the data packet. The data amount of the data packet is used to indicate a capacity of the data packet. If a capacity of a data packet exceeds a maximum value of a capacity of a transport block, or a capacity of multiple multiplexed data packets exceeds a maximum value of a capacity of a transport block, the data packet may be transmitted by blocks.

Optionally, with reference to step 401, in this step, it may be that a first network device 103 sends the scheduling request message to the scheduling device 102, or the second network device 104 or the third network device 105 sends the scheduling request message to the scheduling device 102.

With reference to case 1 in step 401, the gateway 101 sends the data packet directly to the main network device and each coordinated network device. In this case, the main network device is the network device that sends the scheduling request message to the scheduling device 102. The scheduling request message is used to instruct the scheduling device 102 to allocate time-frequency resources, for sending the data packet, to the main network device and each coordinated network device.

With reference to case 2 in step 401, the main network device buffers data packets that carry identifiers of the data packets and sends these data packets to each coordinated network device. In this case, the main network device may send the scheduling device 102 the scheduling request message that is used to instruct the scheduling device 102 to allocate time-frequency resources, for sending the data packet, to the main network device and each coordinated network device.

Optionally, a structure of the scheduling request message may be shown as follows:

```
BSR::={
  User ID         //User identifier
  LCID ID         //Logical channel identifier
  No. of packets  //Total quantity of packets
       Pkt1, Len1  //Identifier of the data packet and a data
amount of the data packet
       Pkt2, Len2
       ...;
  LCID ID
     No. of packets
       Pkt1, Len1
       Pkt2, Len2
  ...;
}
```

403. A scheduling device sends a scheduling grant message to the main network device and each coordinated network device.

The scheduling grant message includes the identifier of the data packet and time-frequency resource information, the identifier of the data packet is used to mark the data packet, and the time-frequency resource information is used to indicate a time domain resource and a frequency domain resource that are occupied for transmitting the data packet.

In this embodiment, the scheduling device 102 may send the scheduling grant message to the first network device 103, the second network device 104, and the third network device 105. Functions of the first network device 103, the second network device 104, and the third network device 105 are the same. That is, the first network device 103, the second network device 104, and the third network device 105 coordinate with each other to jointly transmit the data packet.

The time-frequency resource information is used to indicate a time and a frequency at and on which the data packet is transmitted. That is, the data packet is transmitted during which time segment and on which frequency.

Optionally, the scheduling grant message further includes the identifier of the user equipment, the identifier of the data stream, and modulation and coding information. The identifier of the user equipment is used to mark the user equipment, the identifier of the data stream is used to mark the data stream, the data packet belongs to the data stream, and the modulation and coding information is used to indicate a modulation and coding scheme of the data packet.

Optionally, a structure of the scheduling grant message may be shown as follows:

```
Scheduling grant::={
  PRB    //Time-frequency resource block
  MCS    //Modulation and coding scheme
  ...;
```

-continued

```
User ID         //User identifier
LCID            //Logical channel identifier
No. of packets  //Total quantity of scheduled data packets
    Pkt1, Len1  //Identifiers and data amounts of the
scheduled data packets
    Pkt2, Len2
    ...;
LCID ID
    No. of packets
        Pkt1, Len1
        Pkt2, Len2
...;
}
```

404. Determine, according to an identifier of the data packet, whether the data packet is stored in a buffer.

With reference to case 1 in step 401, the gateway 101 directly sends the data packet to the main network device and each coordinated network device. Because the main network device may send the scheduling request message to the scheduling device 102 according to the received data packet, the main network device does not need to determine whether the data packet is stored in the buffer. Each coordinated network device determines, according to the identifier of the data packet, whether the data packet is stored in the buffer.

With reference to case 2 in step 401, the main network device buffers the data packets and forwards these data packets to each coordinated network device. In this case, each coordinated network device determines, according to the identifier of the data packet, whether the data packet is stored in the buffer.

405. If the data packet is stored in a buffer, send, according to time-frequency resource information, the data packet to user equipment on a time-frequency resource indicated by the time-frequency resource information.

If the data packet is stored in the buffer, modulation and coding may be performed on the data packet according to the modulation and coding information. Then, the data packet and the modulation and coding information are sent to the user equipment on the time-frequency resource indicated by the time-frequency resource information, so that after receiving the data packet, the user equipment decodes the data packet according to the modulation and decoding information.

Optionally, after step 404, the method further includes:

406. If the data packet is not stored in a buffer, skip sending the data packet.

If the data packet is not stored in the buffer, it indicates that the data packet may be lost in a process in which a coordinated network device receives the data packet. In this case, the data packet is not to be sent.

Optionally, if no data packet loss occurs on the coordinated network device, in this case, the multiple data packets may be multiplexed together to form a transport block for transmission. Because the multiple data packets are multiplexed together to form a transport block for transmission, when a data packet on the coordinated network device is lost, another data packet is not to be sent. That is, the coordinated network device does not perform sending this time.

For example, the main network device buffers data packets and forwards these data packets to each coordinated network device. The main network device buffers four to-be-transmitted data packets, the main network device is the first network device 103, the four to-be-transmitted data packets are a data packet A, a data packet B, a data packet C, and a data packet D respectively. In this case, the first network device 103 sends the four data packets to two coordinated network devices, and the two coordinated network devices are the second network device 104 and the third network device 105 respectively. Resulting from a data packet loss, the second network device 104 receives only the data packet A, the data packet C, and the data packet D, but the third network device 105 receives the data packet A, the data packet B, the data packet C, and the data packet D. The first network device 103 sends a scheduling request message to the scheduling device 102. The scheduling request message includes identifiers of the four data packets. The scheduling device 102 generates a scheduling grant message according to the scheduling request message. The scheduling grant message includes the identifiers of the four data packets: the data packet A, the data packet B, the data packet C, and the data packet D. Whether these data packets are buffered in the second network device 104 and the third network device 105 are determined according to the identifiers, of the data packets, included the scheduling grant message. The second network device 104 includes only the data packet A, the data packet C, and the data packet D. The data packet B is not included in the second network device 104, indicating that the data packet is lost, resulting from a cause such as network congestion or a transmission error, in a process in which the main network device transmits the data packet to each coordinated network device. In this case, the second network device 104 does not send the data packet A, the data packet C, or the data packet D. However, no data packet loss occurs on the third network device 105. In this case, the data packet A, the data packet B, the data packet C, and the data packet D may be multiplexed together to form a transport block for sending. In this way, a problem that a data decoding error occurs on user equipment because data packets sent on a same time-frequency resource are different can be resolved.

According to the data transmission method provided by this embodiment of the present invention, a received scheduling grant message includes an identifier of a data packet. It is determined, according to the identifier of the data packet, whether the data packet is stored in a buffer. If the data packet is not stored in a buffer, it indicates that the data packet may be lost in a process in which a gateway or a main network device transmits the data packet to each coordinated network device. In this case, the coordinated network device does not send the data packet. This can resolve a problem that a data decoding error occurs on user equipment because data packets sent by the coordinated network devices on a same time-frequency resource are different.

Figure 5:
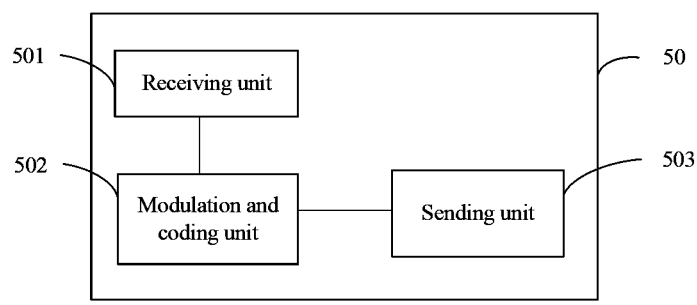
FIG. 5 is a schematic structural diagram of a network device according to an embodiment of the present invention.

Based on the foregoing embodiment corresponding to FIG. 2, an embodiment of the present invention provides a network device 50. Optionally, the network device 50 belongs to the network system shown in FIG. 1. Preferably, in the network system shown in FIG. 1, the network device 50 may be the first network device, the second network device, or the third network device. Applied to the COMP technology, the network device 50 coordinates with another network device to send a same data packet to user equipment. Referring to FIG. 5, the network device 50 includes:

a receiving unit 501, configured to receive a scheduling grant message, where the scheduling grant message includes an identifier of a data packet and time-frequency resource information, the identifier of the data packet is used to mark the data packet, and the time-frequency resource information is used to indicate a time domain resource and a frequency domain resource that are occupied for transmitting the data packet; and a sending unit 503, further configured to: when it is determined, according to the identifier of the data packet, that the data packet is stored in a buffer, send, according to the time-frequency resource information, the data packet to the user equipment on the time-frequency resource indicated by the time-frequency resource information.

Optionally, the sending unit 503 is further configured to send a scheduling request message to a scheduling device. The scheduling request message is used to request the scheduling device to generate the scheduling grant message, and the scheduling request message includes the identifier of the data packet.

Optionally, the scheduling request message further includes an identifier of the user equipment and an identifier of a data stream. The identifier of the data stream is used to mark the data stream, and the data packet belongs to the data stream.

Optionally, the scheduling grant message further includes an identifier of the user equipment, an identifier of a data stream, and modulation and coding information. The identifier of the data stream is used to mark the data stream, the data packet belongs to the data stream, and the modulation and coding information is used to indicate a modulation and coding scheme of the data packet.

The network device 50 further includes a modulation and coding unit 502, configured to: when the data packet is stored in the buffer, perform modulation and coding on the data packet according to the modulation and coding information.

The sending unit 503 is further configured to send the data packet and the modulation and coding information to the user equipment on the time-frequency resource indicated by the time-frequency resource information, so that after receiving the data packet, the user equipment decodes the data packet according to the modulation and decoding information.

Optionally, the receiving unit 501 is further configured to receive the data packet sent by a gateway. The data packet includes the identifier of the data packet. Optionally, the data packet is sent by the gateway to the network device 50 and another network device.

According to the network device provided by this embodiment of the present invention, a received scheduling grant message includes an identifier of a data packet. It is determined, according to the identifier of the data packet, whether the data packet is stored in a buffer. If the data packet is not stored in a buffer, it indicates that the data packet may be lost in a process in which a gateway or a main network device transmits the data packet to each coordinated network device. In this case, the coordinated network device does not send the data packet. This can resolve a problem that a data decoding error occurs on user equipment because data packets sent by the coordinated network devices on a same time-frequency resource are different.

Figure 6:
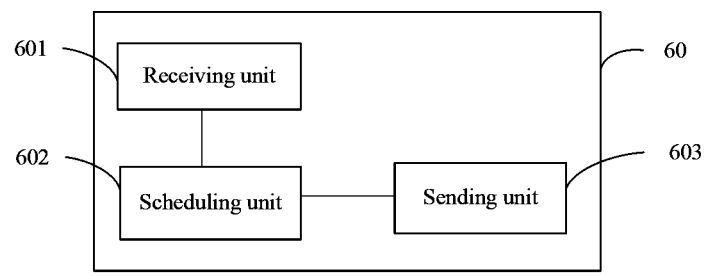
FIG. 6 is a schematic structural diagram of a scheduling device according to an embodiment of the present invention.

Based on the embodiment corresponding to FIG. 3, an embodiment of the present invention provides a scheduling device 60. Optionally, the scheduling device 60 belongs to the network system shown in FIG. 1. The scheduling device 60 is configured to perform physical resource scheduling for each network device in the embodiment corresponding to FIG. 1, and is preferably applied to the COMP technology. Referring to FIG. 6, the scheduling device 60 includes:

a receiving unit 601, configured to receive a scheduling request message, where the scheduling request message includes an identifier of a data packet, and the identifier of the data packet is used to mark the data packet;

a scheduling unit 602, configured to allocate time-frequency resources to at least two network devices according to the scheduling request message and generate time-frequency resource information, where the time-frequency resource information is used to indicate a time domain resource and a frequency domain resource that are occupied for sending the data packet by the at least two network devices; and a sending unit 603, configured to send a scheduling grant message to the at least two network devices, where the scheduling grant message includes the identifier of the data packet and the time-frequency resource information.

Optionally, the scheduling request message further includes an identifier of user equipment and an identifier of a data stream. The identifier of the data stream is used to mark the data stream, and the data packet belongs to the data stream.

The scheduling unit 602 is further configured to determine a modulation and coding scheme of the data packet and generate modulation and coding information. The modulation and coding information is used to indicate the modulation and coding scheme of the data packet.

The scheduling grant message further includes the identifier of the user equipment, the identifier of the data stream, and the modulation and coding information.

According to the scheduling device provided by this embodiment of the present invention, a received scheduling grant message includes an identifier of a data packet, and the scheduling grant message is sent to each network device. In this way, the network device can determine, according to the identifier of the data packet, whether the data packet is stored in a buffer. If the data packet is not stored in a buffer, it indicates that the data packet may be lost in a process in which a gateway or a main network device transmits the data packet to each coordinated network device. In this case, the coordinated network device does not send the data packet. This can resolve a problem that a data decoding error occurs on user equipment because data packets sent by the coordinated network devices on a same time-frequency resource are different.

Figure 7:
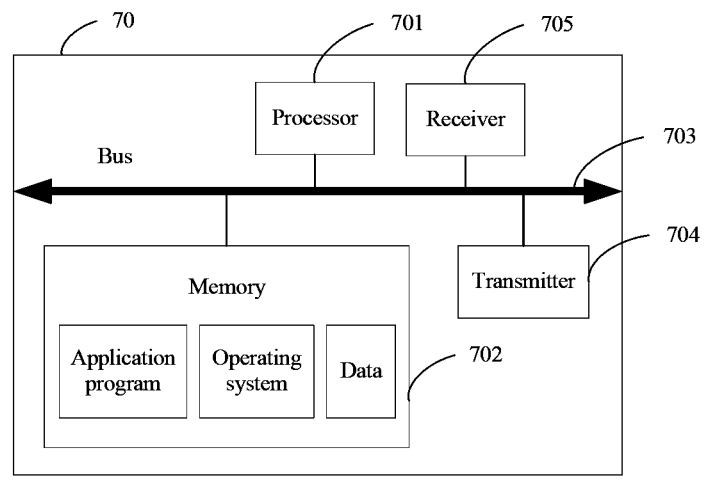
FIG. 7 is a schematic structural diagram of a network device according to another embodiment of the present invention.

Based on the foregoing embodiment corresponding to FIG. 2, another embodiment of the present invention provides a network device 70. Optionally, the network device 70 belongs to the network system shown in FIG. 1. Preferably, in the network system shown in FIG. 1, the network device 70 may be the first network device, the second network device, or the third network device. Referring to FIG. 7, the network device 70 includes: at least one processor 701, a memory 702, a bus 703, a transmitter 704, and a receiver 705. The at least one processor 701, the memory 702, the transmitter 704, and the receiver 705 are connected to each other by using the bus 703 and implement mutual communication.

The bus 703 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 703 may be classified as an address bus, a data bus, a control bus, or the like. For convenience of denotation, the bus is represented by using only one bold line in FIG. 7, which, however, does not indicate that there is only one bus or only one type of buses.

The memory 702 is configured to execute application program code of the solutions of the present invention. The application program code used to execute the solutions of the present invention is stored in the memory, and execution thereof is controlled by the processor 701.

The memory 702 may be a read-only memory ROM or a static storage device of another type that can store static information and instructions, a random access memory RAM or a dynamic storage device of another type that can store information and instructions, or may be an electrically erasable programmable read-only memory EEPROM, a compact disc read-only memory CD-ROM or other compact disk storage, optical disc storage (including a compact disc, a laser disc, an optical disc, a digital versatile disc, and a blue-ray disc, and the like), a disk storage medium or another disk storage device, or any other medium that can be used to carry or store expected program code in a command or data structure form and can be accessed by a computer; however, the memory is not limited thereto. These memories 702 are connected to the processor 701 by using the bus 703.

The processor 701 may be a central processing unit (Central Processing Unit, CPU for short), or an application-specific integrated circuit (Application Specific Integrated Circuit, ASIC for short), or one or more integrated circuits configured to implement this embodiment of the present invention.

The transmitter 704 may include a signal processing module and an antenna. The signal processing module may include a digital signal processor, a filter, a digital-to-analog converter, and the like, and the antenna may be an antenna array.

The receiver 705 may include a signal processing module and an antenna. The signal processing module may include an analog-to-digital converter, a filter, a digital signal processor, and the like, and the antenna may be an antenna array. For a specific form of the transmitter 704 and the receiver 705, the present invention sets no limit thereto.

In this embodiment, specifically,
the receiver 705 is configured to receive a scheduling grant message, where the scheduling grant message includes an identifier of a data packet and time-frequency resource information, the identifier of the data packet is used to mark the data packet, and the time-frequency resource information is used to indicate a time domain resource and a frequency domain resource that are occupied for transmitting the data packet.

The processor 701 is configured to determine, according to the identifier of the data packet, whether the data packet is stored in the memory 702.

The transmitter 704 is configured to: when the data packet is stored in the memory, send the data packet to user equipment on the time-frequency resource indicated by the time-frequency resource information.

Optionally, the transmitter 704 is further configured to send a scheduling request message to a scheduling device. The scheduling request message is used to request the scheduling device to generate the scheduling grant message, and the scheduling request message includes the identifier of the data packet.

Optionally, the scheduling request message further includes an identifier of the user equipment and an identifier of a data stream. The identifier of the data stream is used to mark the data stream, and the data packet belongs to the data stream.

Optionally, the scheduling grant message further includes an identifier of the user equipment, an identifier of a data stream, and modulation and coding information. The identifier of the data stream is used to mark the data stream, the data packet belongs to the data stream, and the modulation and coding information is used to indicate a modulation and coding scheme of the data packet.

The processor 701 is further configured to: when the data packet is stored in the memory 702, perform modulation and coding on the data packet according to the modulation and coding information.

The transmitter 704 is further configured to send the data packet and the modulation and coding information to the user equipment on the time-frequency resource indicated by the time-frequency resource information, so that after receiving the data packet, the user equipment decodes the data packet according to the modulation and decoding information.

Optionally, the receiver 705 is further configured to receive the data packet sent by a gateway. The data packet includes the identifier of the data packet, and the data packet is sent by the gateway to the network device 70 and another network device.

According to the network device provided by this embodiment of the present invention, a received scheduling grant message includes an identifier of a data packet. It is determined, according to the identifier of the data packet, whether the data packet is stored in a buffer. If the data packet is not stored in a buffer, it indicates that the data packet may be lost in a process in which a gateway or a main network device transmits the data packet to each coordinated network device. In this case, the coordinated network device does not send the data packet. This can resolve a problem that a data decoding error occurs on user equipment because data packets sent by the coordinated network devices on a same time-frequency resource are different.

Figure 8:
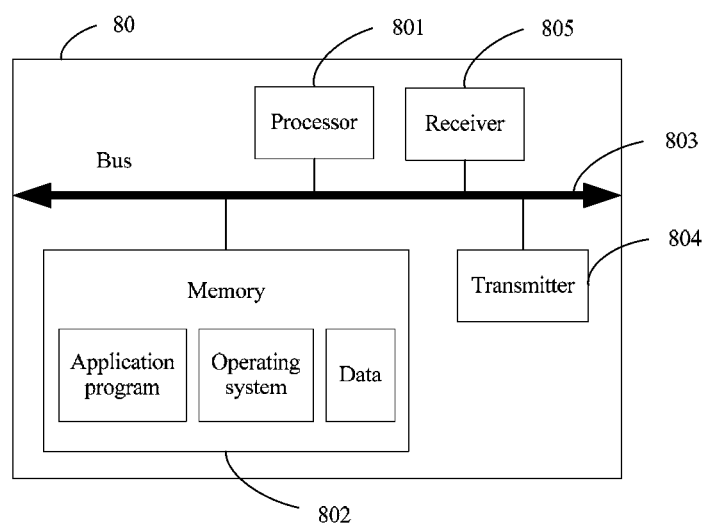
FIG. 8 is a schematic structural diagram of a scheduling device according to another embodiment of the present invention.

Based on the embodiment corresponding to FIG. 3, another embodiment of the present invention provides a scheduling device. Optionally, the scheduling device 80 belongs to the network system shown in FIG. 1. The scheduling device 80 is configured to perform physical resource scheduling for each network device in the embodiment corresponding to FIG. 1. Referring to FIG. 8, the scheduling device 80 includes: at least one processor 801, a memory 802, a bus 803, a transmitter 804, and a receiver 805. The at least one processor 801, the memory 802, the transmitter 804, and the receiver 805 are connected to each other by using the bus 803 and implement mutual communication.

The bus 803 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 803 may be classified as an address bus, a data bus, a control bus, or the like. For convenience of denotation, the bus is represented by using only one bold line in FIG. 7, which, however, does not indicate that there is only one bus or only one type of buses.

The memory 802 is configured to execute application program code of the solutions of the present invention. The application program code used to execute the solutions of the present invention is stored in the memory, and execution thereof is controlled by the processor 801.

The memory may be a read-only memory ROM or a static storage device of another type that can store static information and instructions, a random access memory RAM, or a dynamic storage device of another type that can store information and instructions, or may be an electrically erasable programmable read-only memory EEPROM, a compact disc read-only memory CD-ROM or other compact disk storage, optical disc storage (including a compact disc, a laser disc, an optical disc, a digital versatile disc, and a blue-ray disc, and the like), a disk storage medium or another disk storage device, or any other medium that can be used to carry or store expected program code in a command or data structure form and can be accessed by a computer; however, the memory is not limited thereto. These memories connect to the processor by using the bus.

The processor 801 may be a central processing unit 801 (Central Processing Unit, CPU for short), or an application-specific integrated circuit (Application Specific Integrated Circuit, ASIC for short), or one or more integrated circuits configured to implement this embodiment of the present invention.

The transmitter 804 may include a signal processing module and an antenna. The signal processing module may include a digital signal processor, a filter, a digital-to-analog converter, and the like, and the antenna may be an antenna array.

The receiver 805 may include a signal processing module and an antenna. The signal processing module may include an analog-to-digital converter, a filter, a digital signal processor, and the like, and the antenna may be an antenna array. For a specific form of the transmitter 704 and the receiver 705, the present invention sets no limit thereto. In this embodiment, specifically, the receiver 805 is configured to receive a scheduling request message, where the scheduling request message includes an identifier of a data packet, the identifier of the data packet is used to mark the data packet, and the data packet is a data packet that user equipment needs to receive.

The processor 801 is configured to allocate time-frequency resources to at least two network devices according to the scheduling request message and generate time-frequency resource information. The time-frequency resource information is used to indicate a time domain resource and a frequency domain resource that are occupied for sending the data packet by the at least two network devices.

The transmitter 804 is configured to send a scheduling grant message to the at least two network devices. The scheduling grant message includes the identifier of the data packet and the time-frequency resource information.

Optionally, the scheduling request message further includes an identifier of the user equipment and an identifier of a data stream. The identifier of the data stream is used to mark the data stream, and the data packet belongs to the data stream.

The processor 801 is further configured to determine a modulation and coding scheme of the data packet and generate modulation and coding information. The modulation and coding information is used to indicate the modulation and coding scheme of the data packet.

The scheduling grant message further includes the identifier of the user equipment, the identifier of the data stream, and the modulation and coding information.

According to the scheduling device provided by this embodiment of the present invention, a received scheduling grant message includes an identifier of a data packet, and the scheduling grant message is sent to each network device. In this way, the network device can determine, according to the identifier of the data packet, whether the data packet is stored in a buffer. If the data packet is not stored in a buffer, it indicates that the data packet may be lost in a process in which a gateway or a main network device transmits the data packet to each coordinated network device. In this case, the coordinated network device does not send the data packet. This can resolve a problem that a data decoding error occurs on user equipment because data packets sent by the coordinated network devices on a same time-frequency resource are different.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a computer. The following is taken as an example but is not limited. The computer readable medium may include a RAM (Random Access Memory, random access memory), a ROM (Read Only Memory, read-only memory), an EEPROM (Electrically Erasable Programmable Read Only Memory, electrically erasable programmable read-only memory), a CD-ROM (Compact Disc Read Only Memory, compact disc read-only memory) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a DSL (Digital Subscriber Line, digital subscriber line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present invention includes a CD (Compact Disc, compact disc), a laser disc, an optical disc, a DVD disc (Digital Versatile Disc, digital versatile disc), a floppy disk and a Blu-ray disc. The disk generally copies data by a magnetic means, and the disc copies data optically by a laser means. The foregoing combination should also be included in the protection scope of the computer-readable medium.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network device, comprising a processor, a bus, a transmitter, a receiver, and a non-transitory computer-readable memory including computer-executable instructions executed by the processor to perform operations comprising:
    receiving, by the receiver, a scheduling grant message, comprising an identifier of a data packet, time-frequency resource information, a logical channel identifier, a total number of packets under the logical channel identifier, an identifier of the user equipment, an identifier of a data stream, and modulation and coding information, wherein the identifier of the data stream is used to mark the data stream, the data packet belongs to the data stream, and the modulation and coding information is used to indicate a modulation and coding scheme of the data packet and the identifier of the data packet is used to mark the data packet, the time-frequency resource information is used to indicate a time domain resource and a frequency domain resource that are occupied for transmitting the data packet;

determining, by the processor, according to the identifier of the data packet, that the data packet is stored in the memory; and when the processor determines that the data packet is stored in the memory, performing modulation and coding on the data packet according to the modulation and coding information and sending, by the transmitter, according to the time-frequency resource information, the data packet to user equipment on the time-frequency resource indicated by the time-frequency resource information and the modulation and coding information to the user equipment on the time-frequency resource indicated by the time-frequency resource information;

wherein the processor, the memory, the transmitter, and the receiver are connected to each other by using the bus.

2. The network device according to claim 1, wherein the operations further comprise:

sending, by the transmitter, a scheduling request message to a scheduling device, wherein the scheduling request message is used to request the scheduling device to generate the scheduling grant message, and the scheduling request message comprises the identifier of the data packet.

3. The network device according to claim 2, wherein the scheduling request message further comprises an identifier of the user equipment and an identifier of a data stream, wherein the identifier of the data stream is used to mark the data stream, and the data packet belongs to the data stream.

4. The network device according to claim 1, wherein the operations further comprise:

receiving, by the receiver, the data packet sent by a gateway, wherein the data packet comprises the identifier of the data packet.

5. A scheduling device, comprising a processor, a bus, a transmitter, a receiver, and a non-transitory computer-readable memory including computer-executable instructions executed by the processor to perform operations comprising:

receiving, by the receiver, a scheduling request message comprising an identifier of a data packet, a logical channel identifier, a total number of packets under the logical channel identifier, an identifier of the user equipment and an identifier of a data stream, wherein the identifier of the data stream is used to mark the data stream, and the data packet belongs to the data stream and the identifier of the data packet is used to mark the data packet;

determining a modulation and coding scheme of the data packet and generating modulation and coding information, wherein the modulation and coding information is used to indicate the modulation and coding scheme of the data packet;

allocating, by the processor, time-frequency resources to at least two network devices according to the scheduling request message and generating time-frequency resource information, wherein the time-frequency resource information indicates a time domain resource and a frequency domain resource that are occupied for sending the data packet by the at least two network devices; and sending, by the transmitter, a scheduling grant message to the at least two network devices, wherein the scheduling grant message comprises the identifier of the data packet, the time-frequency resource information, the identifier of the user equipment, the identifier of the data stream, and the modulation and coding information;

wherein the processor, the memory, the transmitter, and the receiver are connected to each other by using the bus.

6. A data transmission method, comprising:

receiving a scheduling grant message comprising an identifier of a data packet, time-frequency resource information, a logical channel identifier, a total number of packets under the logical channel identifier, an identifier of the user equipment, an identifier of a data stream, and modulation and coding information, wherein the identifier of the data stream is used to mark the data stream, the data packet belongs to the data stream, and the modulation and coding information is used to indicate a modulation and coding scheme of the data packet and the identifier of the data packet is used to mark the data packet, and the time-frequency resource information is used to indicate a time domain resource and a frequency domain resource that are occupied for transmitting the data packet; and when the data packet is stored in the buffer, performing modulation and coding on the data packet according to the modulation and coding information, and sending, according to the time-frequency resource information, the data packet to user equipment on the time-frequency resource indicated by the time-frequency resource information, when it is determined, according to the identifier of the data packet, that the data packet is stored in a buffer.

7. The method according to claim 6, further comprising, before the receiving a scheduling grant message:

sending a scheduling request message to a scheduling device, wherein the scheduling request message is used to request the scheduling device to generate the scheduling grant message, and the scheduling request message comprises the identifier of the data packet.

8. The method according to claim 7, wherein the scheduling request message further comprises an identifier of the user equipment and an identifier of a data stream, wherein the identifier of the data stream is used to mark the data stream, and the data packet belongs to the data stream.

9. The method according to claim 6, further comprising, before the receiving a scheduling grant message:

receiving the data packet sent by a gateway, wherein the data packet comprises the identifier of the data packet.

10. A data transmission method, comprising:

receiving a scheduling request message comprising an identifier of a data packet, a logical channel identifier, a total number of packets under the logical channel identifier, an identifier of user equipment and an identifier of a data stream, wherein the identifier of the data stream is used to mark the data stream, and the data packet belongs to the data stream and the identifier of the data packet is used to mark the data packet;

determining a modulation and coding scheme of the data packet and generating modulation and coding information, wherein the modulation and coding information is used to indicate the modulation and coding scheme of the data packet allocating time-frequency resources to at least two network devices according to the scheduling request message and generating time-frequency resource information, wherein the time-frequency resource information indicates a time domain resource and a frequency domain resource that are occupied for sending the data packet by the at least two network devices; and sending a scheduling grant message to the at least two network devices, wherein the scheduling grant message comprises the identifier of the data packet, the time-frequency resource information, the identifier of the user equipment, the identifier of the data stream, and the modulation and coding information.

* * * * *